US009552340B2

(12) United States Patent
Marsh

(10) Patent No.: US 9,552,340 B2
(45) Date of Patent: Jan. 24, 2017

(54) METHOD AND COMPUTER-READABLE MEDIA FOR COMPARING ELECTRONIC DOCUMENTS

(71) Applicant: Robert E. Marsh, Kansas City, MO (US)

(72) Inventor: Robert E. Marsh, Kansas City, MO (US)

(*) Notice: Subject to any disclaimer, the term of this patent is extended or adjusted under 35 U.S.C. 154(b) by 447 days.

(21) Appl. No.: 14/048,574

(22) Filed: Oct. 8, 2013

(65) Prior Publication Data
US 2014/0101526 A1    Apr. 10, 2014

Related U.S. Application Data

(60) Provisional application No. 61/795,060, filed on Oct. 9, 2012.

(51) Int. Cl.
*G06F 17/30* (2006.01)
*G06F 17/22* (2006.01)

(52) U.S. Cl.
CPC ....... *G06F 17/2288* (2013.01); *G06F 17/2211* (2013.01)

(58) Field of Classification Search
CPC ............. G06F 17/2288; G06F 17/2211; Y10S 707/99954
USPC ......................................................... 715/229
See application file for complete search history.

(56) References Cited

U.S. PATENT DOCUMENTS

| | | | | |
|---|---|---|---|---|
| 5,598,557 A | * | 1/1997 | Doner | G06F 17/30687 |
| 5,898,836 A | * | 4/1999 | Freivald | G06F 17/3089 |
| | | | | 707/E17.116 |
| 6,272,484 B1 | * | 8/2001 | Martin | G06F 17/30884 |
| 7,565,620 B1 | * | 7/2009 | Kershaw | G06F 3/0481 |
| | | | | 715/781 |
| 2002/0107768 A1 | | 8/2002 | Davis et al. | |
| 2007/0208697 A1 | * | 9/2007 | Subramaniam | G06F 17/30545 |
| 2008/0189608 A1 | * | 8/2008 | Nurmi | G06F 17/241 |
| | | | | 715/273 |

(Continued)

OTHER PUBLICATIONS

Rtomayko, "Introducing GitHub Comparison View", Mar. 4, 2010, https://web.archive.org/web/20100304013423/http://github.com/blog/612-introducing-github-compare-view.*

(Continued)

*Primary Examiner* — Stephen Hong
*Assistant Examiner* — Broderick Anderson
(74) *Attorney, Agent, or Firm* — Hovey Williams LLP

(57) ABSTRACT

A computer program and computer-implemented method for assisting a use in selecting versions of a document to be compared and reviewed. The method may include storing a plurality of documents in a database and creating comparison documents that each depicts differences between different pairs of the documents. The method may also include selecting one of the documents to be a current document, then displaying comparison data for assisting the user in selecting one of the documents as a base document. The comparison data may include keyword search results and marked differences between user-selected sections of the documents as extracted from the comparison documents. Based on the comparison data, the user may select one of the documents in the database to be the base document. Finally, the method may include opening and displaying a specific one of the comparison documents associated with the current document and the base documents.

17 Claims, 4 Drawing Sheets

REDLINE CREATION

Current Document: | 6 | 06/06/12 | Parker |

Select Comparison Section    Search Text    More Tools

| Select | Base Version | Posting Date | Posted By | Opened By You | Used For Prior Redline | Flagged |
|---|---|---|---|---|---|---|
| ☐ | 1 | 05/12/12 | Smith | No | No | * |
| ☐ | 2 | 05/20/12 | Jones | Yes | No | |
| ☐ | 3 | 06/01/12 | Parker | Yes | Yes | * |
| ☐ | 4 | 06/03/12 | Smith | No | No | |
| ☐ | 5 | 06/03/12 | Jones | No | No | |

(56) References Cited

U.S. PATENT DOCUMENTS

| | | | |
|---|---|---|---|
| 2008/0313186 A1 | 12/2008 | Marsh | |
| 2010/0257457 A1* | 10/2010 | De Goes | H04L 65/1093 715/751 |
| 2012/0133989 A1* | 5/2012 | Glover | G06F 17/241 358/1.18 |
| 2014/0033088 A1* | 1/2014 | Shaver | G06F 17/212 715/764 |

OTHER PUBLICATIONS

Rtomayko, "Introducing GitHub Comparison View", Mar. 4, 2010, <https://web.archive.org/web/20100304013423/http://github.com/blog/612-introducing-github-compare-view>.*

* cited by examiner

REDLINE CREATION

Current Document: | 6   06/06/12   Parker |

[Select Comparison Section]   [Search Text]   [More Tools]

| Select | Base Version | Posting Date | Posted By | Opened By You | Used For Prior Redline | Flagged |
|---|---|---|---|---|---|---|
| ☐ | 1 | 05/12/12 | Smith | No | No | * |
| ☐ | 2 | 05/20/12 | Jones | Yes | No | |
| ☐ | 3 | 06/01/12 | Parker | Yes | Yes | * |
| ☐ | 4 | 06/03/12 | Smith | No | No | |
| ☐ | 5 | 06/03/12 | Jones | No | No | |

*Fig. 3*

SELECT SECTION

Selected Current Version Text: | The purchase price is $6,000,000. |

Base Version Comparable Text:

| Select | Base Version | Posting Date | Posted By |
|---|---|---|---|
| ☐ | 1 | 05/12/12 | Smith |
| ☐ | 2 | 05/20/12 | Jones |
| ☐ | 3 | 06/01/12 | Parker |
| ☐ | 4 | 06/03/12 | Smith |
| ☐ | 5 | 06/03/12 | Jones |

The purchase price is $5,500,000 $6,000,000.

*Fig. 4*

| DATABASE OF COMPARISON DOCUMENTS | | | | | | |
|---|---|---|---|---|---|---|
| Document Version | 1 | 2 | 3 | 4 | 5 | 6 |
| 1 | | Redline 1v2 | Redline 1v3 | Redline 1v4 | Redline 1v5 | Redline 1v6 |
| 2 | Redline 2v1 | | Redline 2v3 | Redline 2v4 | Redline 2v5 | Redline 2v6 |
| 3 | Redline 3v1 | Redline 3v2 | | Redline 3v4 | Redline 3v5 | Redline 3v6 |
| 4 | Redline 4v1 | Redline 4v2 | Redline 4v3 | | Redline 4v5 | Redline 4v6 |
| 5 | Redline 5v1 | Redline 5v2 | Redline 5v3 | Redline 5v4 | | Redline 5v6 |
| 6 | Redline 6v1 | Redline 6v2 | Redline 6v3 | Redline 6v4 | Redline 6v5 | |

US 9,552,340 B2

METHOD AND COMPUTER-READABLE MEDIA FOR COMPARING ELECTRONIC DOCUMENTS

RELATED APPLICATIONS

This application claims priority benefit of a provisional application entitled, "Method and Computer-Readable Media for Comparing Electronic Documents," Ser. No. 61/795,060, filed Oct. 9, 2012 and incorporated by reference herein in its entirety.

BACKGROUND

Electronic documents can be created based on user input using a computer software application (such as Microsoft Word, Microsoft Excel, etc.). Electronic documents may be reviewed on a computer monitor and/or may be printed for review and may be transmitted electronically to other users via email or using an on-line document collaboration system.

Document comparison (often called "redlining") software applications are widely used to compare two electronic documents. Specifically, the redlining applications compare electronic documents and display differences between them, streamlining their review. An output document showing the differences between the two compared documents is referred to as a "redline" or "redline document." The two documents compared are typically an older base version or base document and a newer current version or current document.

In a complex transaction in which dozens of versions of a document have been exchanged, selecting a correct base document for comparison is often difficult, particularly if the most useful base document is not the immediately prior version. Different reviewers may have studied different prior versions, and therefore each would prefer seeing a different comparison. Moreover, sometimes weeks may pass between the exchange of draft versions, and the process may continue for months with multiple drafts exchanged. A project participant may have reviewed some of the versions, but not necessarily all of them, and may not recall which versions they have and have not reviewed. Upon receiving a new draft, the user is faced with identifying changes, comparing those changes with what was last studied by the user—recognizing that the last studied draft might or might not be the most recent prior draft.

Specifically, if multiple parties are exchanging drafts, a user may be confused as to what two versions of a document to compare via the redlining application. For example, a user may want to see changes between the current document and a previous version of the document last reviewed by the user. However, if an interim version of the document submitted between the current version and the previous version is accidentally selected for comparison instead, the user may inadvertently overlook critical changes because they are not flagged as changes in the comparison document or redline, since these changes also appeared in the interim document.

SUMMARY

Embodiments of the present invention solve the above described problems by providing a computer program and computer-implemented method for assisting a user in determining which versions of a document to compare and review. The method may include the steps of storing a plurality of documents in a database and creating comparison documents that each depicts differences between different pairs of the documents. Specifically, the comparison document presents text that is the same in both documents in a first text style, text that is only found in an older version of the document in a second text style, and text that is only found in a newer version of the document in a third text style.

The method may also include selecting one of the documents to be a current document, then displaying comparison data for assisting the user in selecting one of the documents as a base document. The comparison data may include keyword search results and marked differences between user-selected sections of the documents as extracted from the comparison documents. Based on the comparison data, the user may select one of the documents in the database to be the base document. Finally, the method may include opening and displaying a specific one of the comparison documents that depicts differences between the current document and the base document.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the preferred embodiments and the accompanying drawing figures.

BRIEF DESCRIPTION OF THE DRAWING FIGURES

Embodiments of the present invention are described in detail below with reference to the attached drawing figures, wherein:

FIG. 3 is a screen shot of a second menu for selecting a base document for comparison with the current document selected in the first menu of FIG. 2;

FIG. 4 is a screen shot of a third menu for displaying comparison data regarding specific keywords or specific sections of the current document and comparing these keywords or sections of the current document with the document versions listed in FIG. 3 to assist the user in selecting one of the document versions as the base document;

Figures 1, 2:
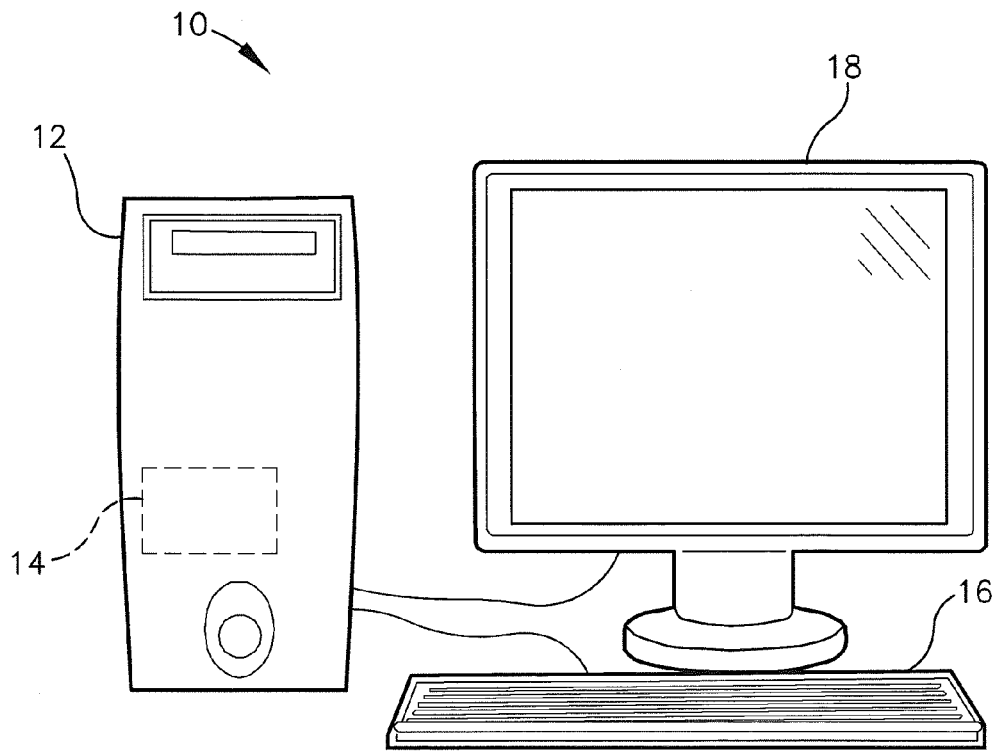
FIG. 1 is a schematic view of a processing system that may be used to implement aspects of the present invention.
FIG. 2 is a screen shot of a first menu for selecting a current document for comparison using the processing system of FIG. 1.

The drawing figures do not limit the present invention to the specific embodiments disclosed and described herein. The drawings are not necessarily to scale, emphasis instead being placed upon clearly illustrating the principles of the invention.

DETAILED DESCRIPTION

The following detailed description of embodiments of the invention is intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the present invention is defined only by claims presented in subsequent regular utility applications, along with the full scope of equivalents to which such claims are entitled.

In this description, references to "one embodiment," "an embodiment," or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, step, etc. described in one embodiment may also be included in other embodiments, but is not necessarily included. Thus, the present technology can include a variety of combinations and/or integrations of the embodiments described herein.

Embodiments of the present invention provide a processing system 10, computer program, and method for assisting a user in selecting electronic documents for visual comparison with each other. This invention addresses issues surrounding the identification of a most appropriate base document for each user to compare with a current document uploaded or selected by the user and to display a most appropriate comparison document for that user.

As illustrated in FIG. 1, an embodiment of the processing system 10 may comprise at least one processor 12, memory 14, a user interface 16, a display 18, and other standard computer processor and/or server components known in the art, such as I/O ports, power cords, power sources, etc. The processing system 10 illustrated and described herein may be replaced with other systems and components without departing from the scope of the invention.

The processor 12 may include any number of computer processors, servers, controllers, integrated circuits, programmable logic devices, or other computing devices and resident or external memory for storing data, executable code segments, images, and other information accessed and/or generated by the processing system 10. In some embodiments of the invention, the processor 12 may include a plurality of processors remotely located from each other and configured to communicate via internet connections and/or a commonly accessible Web site. For example, in some embodiments of the invention, the processing system 10 may be an online document collaboration system, allowing users to submit and retrieve documents to and from a shared database, such as a version archive described below, such as the on-line system of exchanging transaction documents described in U.S. patent application Ser. No. 12/151,706, incorporated by reference herein in its entirety.

The processor 12 and/or the memory 14 may have a computer program, algorithms, and/or code segments stored thereon or accessible thereby for performing the method steps described herein. The computer program preferably comprises an ordered listing of executable instructions for implementing logical functions in the processor 12. The computer program can be embodied in any computer-readable medium for use by or in connection with an instruction execution system, apparatus, or device, and execute the instructions. In the context of this application, a "computer-readable medium" can be any system and/or device that can contain, store, communicate, propagate, or transport the program for use by or in connection with an instruction execution system, apparatus, or device. The computer-readable medium can be, for example, but not limited to, an electronic, magnetic, optical, electromagnetic, infrared, or semi-conductor system, apparatus or device. More specific, although not inclusive, examples of the computer-readable medium would include the following: an electrical connection having one or more wires, data storage devices such as hard disk drives or solid-state drives, a portable computer diskette, a random access memory (RAM), a read-only memory (ROM), an erasable, programmable, read-only memory (EPROM or Flash memory), an optical fiber, and a portable compact disk read-only memory (CDROM).

The memory 14 may include, for example, removable and non-removable memory elements such as RAM, ROM, flash, magnetic, optical, USB memory devices, and/or other conventional memory elements. The memory 14 may store the computer program and/or at least some of the code segments mentioned above, or other data for instructing the processor 12 to perform various method steps described herein. The memory 14 may also store various electronic documents, various edited versions of electronic documents, and comparison documents showing differences between a pair of the electronic documents or between edited versions thereof. For example, the memory 14 may store therein data related to an online document collaboration system, a version archive or database comprising more than two versions of a document, and/or document comparison software, applications, or related code segments, such as redlining software applications. The memory 14 may additionally store data associated with the electronic documents, comparison data, user activity, and document data, as later described herein. The various data stored within the memory may also be associated within one or more databases to facilitate retrieval of the information.

The user interface 16 may permit a user to operate the processing system 10 and enables users, third parties, or other devices to share information with the processing system 10. The user interface 16 may comprise one or more functionable inputs such as buttons, switches, scroll wheels, a touch screen associated with the display, voice recognition elements such as a microphone, pointing devices such as mice, touchpads, tracking balls, styluses, a camera such as a digital or film still or video camera, combinations thereof, etc. Further, the user interface 16 may comprise wired or wireless data transfer elements such as removable memory, data transceivers, etc., to enable the user and other devices or parties to remotely interface with the processing system 10. The user interface 16 may also include a speaker for providing audible instructions and feedback.

The display 18 may comprise a graphical interface operable to display visual graphics, images, text, etc. in response to external or internal processes and commands. For example, the display 18 may comprise conventional black and white, monochrome, or color display elements including CRT, TFT, LCD, and/or LED display devices. The display 18 may be integrated with the user interface 16, such as in embodiments where the display is a touch screen display to enable the user to interact with it by touching or pointing at display areas to provide information or selections to the processor 12. The display 18 may be coupled with or integral with the processor 12 and may be operable to display various information corresponding to the electronic documents, edited versions of the electronic documents, the comparison documents, comparison data, user data, document data, etc.

The terms "documents," "versions," and "document versions" used herein may generally refer to any electronic documents known in the art, such as Word Documents, Excel Documents, HTML documents and PDF documents. The electronic documents may include text therein and may be editable. In some embodiments of the invention, the documents or versions in the version archive are slightly modified or edited versions of each other, saved with document names that separately identify each edited version of the documents therein to be compared with each other.

For example, the version archive stored in the memory 14 may comprise an original document, a first edited version of the original document, a second edited version of the document, and so on. Note that the second edited version may be a document directly edited from the original document or may be a document directly edited from the first edited version of the original document. Alternatively, the documents or versions stored in the version archive may not be directly edited from each other, but nevertheless may be similar enough that a comparison is desired. The version archive may comprise documents saved, uploaded, or posted therein by multiple users. The multiple users may access the version archive from a plurality of remote locations from each other using various processors or computing devices.

A "comparison document," also referred to as a redline document herein, may be a document generated by any comparison software application by comparing at least two electronic documents, such as any pair of electronic documents or document versions stored in the version archive. The comparison document may presents text that is the same in both the current and base documents in a first text style, text that is only found in the base document and therefore deleted in the current document in a second text style, and text that is only found in the current document and therefore newly added in the current document in a third text style. A text style, as defined herein, may refer to the font of the text, the size of the text, the color of the text, and/or whether the text is bolded, underlined, marked with a strikethrough, highlighted, or italicized. Additionally, the text style may include a move in a location of deleted text (e.g., moving deleted text to a margin of the document) or other changes or markings to the document as used in various redlining applications known in the art.

Specifically, the comparison document may show text and/or style additions and/or deletions with highlighted, underlined, bracketed, or otherwise distinguished text, such as different colors of text, etc. The current document is typically a more-recent version of the base document. So if text in the current document is absent from the base document, this is shown as an addition (e.g., added text underlined), whereas if text in the base document is absent from the current document, this is shown as a deletion (e.g., deleted text struck-out). Comparison software applications are well known in the art and are not described in detail here. As noted above, the comparison software applications may be stored in the memory 14 and/or accessed and executed by the processor 12.

A method of the present invention may generally include uploading or selecting the current document to be reviewed, then collecting, storing, generating, and/or presenting data to identify or assist in identifying which one of a plurality of documents in the version archive is most relevant to the user to be used as the base version for comparison. Then a comparison document comparing the selected current document to the selected base document may be generated and/or displayed. The most relevant base document may be identified using various relevance predicting parameters, which may be user defined, user specified with system assistance, or system generated via the processing system 10. Using input provided by the user via the user interface 16, a most relevant comparison document is provided on the display 18 or otherwise provided to the user.

Figure 7:
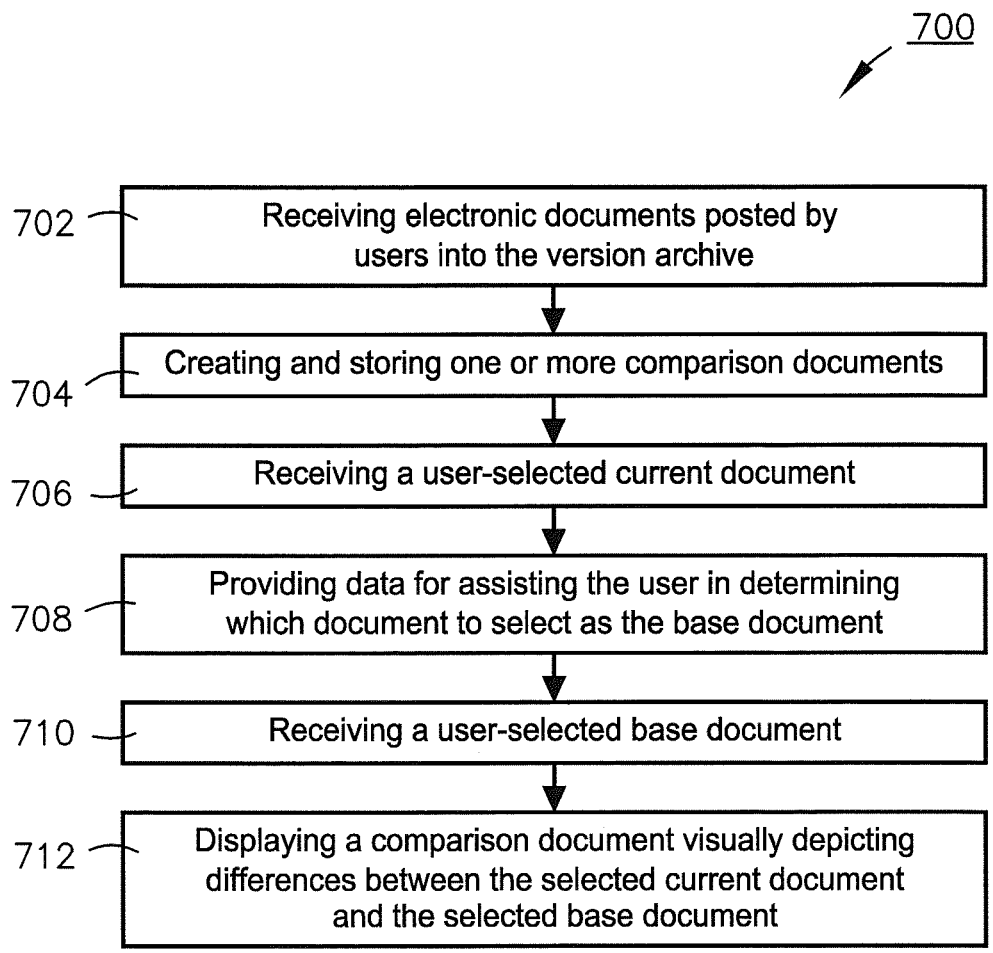
FIG. 7 is a flow chart illustrating a method for assisting the user in selecting electronic documents for use in creating a comparison document indicating changes made between a selected base version and a selected current version.

The flow chart of FIG. 7 depicts portions of a computer program and/or the steps of an exemplary method 700 of assisting a user in selecting documents or document versions for comparison in more detail. In some alternative implementations, the functions noted in the various blocks may occur out of the order depicted in FIG. 7. For example, two blocks shown in succession in FIG. 7 may in fact be executed substantially concurrently, or the blocks may sometimes be executed in the reverse order depending upon the functionality involved. Additionally, some blocks may be omitted without departing from the scope of the invention. At least some of the method steps described herein may represent computer executable code segments or algorithms to be executed by the processing system 10 described above.

As illustrated in FIG. 7, the method 700 begins when the processing system 10 receives electronic documents posted or otherwise submitted by authenticated users into the version archive of the memory 14, as depicted in block 702. Documents submitted as versions for subsequent modification may be assigned version identifiers by the computer program or code segments thereof in an automated manner. The processor 12 may communicate with the version archive and associated software for storage of these electronic documents and related version identifiers. The computer programs, software, and code segments described herein may be installed on one computer or on different computers, as noted above. Authenticated users may download or otherwise retrieve electronic documents from the version archive.

Figures 5, 6:
FIG. 5 is a screen shot of a comparison document generated by the processing system of FIG. 1 using the selected current document and the selected base document.
FIG. 6 is a table showing comparison documents created for each possible pair of documents in the version archive.

Next, in some embodiments of the invention, the method may comprise creating and storing one or more comparison documents, as depicted in block 704 and FIG. 6. For example, each time a user posts or uploads a document to the version archive, a comparison document or redline document may be created between this newly-added document and at least one of the other documents or versions in the version archive. In some embodiments of the invention, each document in the version archive is compared with each other document in the version archive, such that for each possible pairing of documents for comparison in the version archive a corresponding comparison document is created and stored in a memory or database, such as in the memory 14. The advance creation of a set of comparison documents as shown in FIG. 6 provides an immediate source for comparison data used to assist a user in selecting a base version, without delays for excessive processing time.

The method may then include a step of receiving a document from the user or receiving a selection of one of the documents or versions in the version archive from the user to be a current document used for comparison, as depicted in block 706 and FIG. 2. Then the method may comprise tracking, generating, and/or providing data including comparison data, user activity data, and/or document data for assisting the user in determining which version or which document in the version archive to select as a base document to be compared with the current document, as depicted in block 708 and FIGS. 3 and 4. Based on this data, the user may select one of the documents in the version archive as the base document via the user interface 16. Thus, the method may comprise a step of receiving a selection (from the user and/or the processing system 10) of which one of the documents in the version archive is the base document, as depicted in block 710. Finally, the method may comprise a step of opening, creating, or otherwise displaying a comparison document or redline document comparing the selected current document and the selected base document, as depicted in block 712 and FIG. 5. For example, the comparison document previously created in step 704 and associated with the selected current document and the selected base document may be retrieved and displayed on the display 18. Alternatively, the comparison document may be created or generated after the selection of the current document and the base document is made.

The comparison data may comprise the comparison documents themselves and the contents therein, information regarding the comparison documents, and/or information regarding comparisons between user-provided data or text (such as typed in a dialogue box) and various ones of the electronic documents. The comparison data may also include information regarding whether or not a user has previously compared certain ones of the electronic documents with each other.

Specifically, in some embodiments of the invention, a dialogue box may be presented to the user on the display 18 and the user may enter text of interest (e.g., keywords) in the dialogue box via the user interface 16. The text of interest in the dialogue box may then be compared with text in each of the document versions in the version archive, such as via a keyword search. For instance, the user may enter the text of interest in the dialogue box, such as the words "purchase price", and a window may appear on the display 18 listing only the document versions with these keywords or key phrase. Alternatively, the window may display all of the versions, but mark or otherwise visually indicate which listed document versions contain the text of interest entered into the dialogue box. In some embodiments of the invention, an entire section of the document (e.g., a sentence or paragraph) that includes the text of interest may be displayed when a mouse pointer passes over that particular listed document. For example, if the text of interest is "price," and a listed one of the documents over which the mouse pointer is hovering contains the word "price," a window may pop up displaying the entire sentence in which the word "price" appears in that document.

As illustrated in FIG. 4, the step 708 may further include selecting particular sections (e.g., paragraphs, sentences, phrases, etc.) in the current document for comparison with corresponding sections in each of the other documents of the version archive to generate and display comparison data. For example, as illustrated in FIG. 4, a sentence regarding the purchase price in the current document may be selected (via highlighting text of the current document with a mouse pointer or any other selection means known in the art). Then a listing of the document versions available for selecting as the base document may be displayed, and when the user rolls the mouse pointer over each of the versions (or alternatively selects or "right clicks" each of the versions), the same sentence regarding the purchase price is displayed in a comparison or redlined format in a bubble, pop-up window, or any other display that allows simultaneous viewing of the listing of document versions, as illustrated in FIG. 4. The bubble or pop-up window may specifically contain marked or redlined text of the relevant document section extracted from a corresponding one of the comparison documents. Thus, a user can see, at a glance, if the purchase price was changed between the current document and any of the other document versions in the version archive. This real time, side-by-side review of specific portions of different comparison documents assists in choosing a desired base document or comparison document for review. Based on this comparison data, the user may select one of the document versions as the base document, and the comparison document corresponding to the current document and the selected base document may be opened and displayed to the user, as in FIG. 5.

In some embodiments of the invention, comparison data may also include an issues list. The issues list may identify only differences between document versions (omitting portions that are identical), thereby assisting the user in identifying a most relevant base document based on which issues are of interest to the user. Additionally or alternatively, the issues list may list a numerical value depicting the number of changes made between the selected current document and each of the other documents in the version archive. The issues list may provide other various types of data related to changes marked in the comparison documents associated with the selected current document, such as page numbers, paragraph numbers, or sections edited or changed between one of the document versions and the selected current document.

As noted above and illustrated in FIG. 3, user activity data may also be provided to the user to assist in identifying a most-useful base document for comparison and review. The user activity data may comprise information regarding if the user has previously opened certain ones of the documents, including a date and/or time the user opened the documents and how long the user had those documents open for review. Furthermore, the user activity data may include an indication if certain ones of the documents have not yet been opened by the user and therefore should not be used for comparison, as later described herein. The user activity data may also indicate if a user has flagged or otherwise marked certain ones of the documents as having particular importance, being desired for later comparison, and/or being a version of the document last reviewed by the user.

It may be desirable to not make user activity data available to other users, or only to selected users. User activity data generated and stored could include, for example, a number of times the user has opened the version, a total amount of time the user has had a version open, and/or whether the user has previously made a redline using this version. In addition to the examples above, user activity data parameters could also include the ability to flag or mark a version as an especially relevant or prioritized version, and similarly mark certain versions as unread and not to be used for comparison purposes. The user activity data may also be displayed to the user on the display 18 in a table or any other format useful in assisting the user in determining which base document to select for comparison with the current document, such that the corresponding comparison document can be generated by the computer program and/or viewed by the user.

As noted above and illustrated in FIG. 2, document data may also be provided to the user to assist in identifying a most-useful base document for comparison and review. Additionally or alternatively, the document data may also be provided to the user to assist in identifying a most-useful current document for comparison and review with one of the other documents in the version archive.

The document data may comprise information such as document file names, document file types, a time and/or date of posting, an identity of the poster, file size, date last modified, etc. This information may be simultaneously listed on the display 18 via the processor 12 in any format. For example, the document data may be listed in individual columns of a table listing each of the documents in the version archive, such that a user may simultaneously view document data for each of the documents. In some embodiments of the invention, the listed documents in this table may be selectable by the user via the user interface 16, such that the user may select one of the documents to review or one of the documents to serve as the current document or base document for which a corresponding comparison document is to be created and/or viewed.

Some additional or alternative embodiments of the invention may allow the processing system 10 and/or the code segments executed thereby to predict or assist in predicting which of the documents in the version archive should be used as the base document. This step may include narrowing options displayed to the user to only display some of the documents in the version archive based on various predictive algorithms. Predictions may be based on user-defined relevance parameters, user activity data, comparison data, and other factors, such as past user preferences. For example, the method may include a step of recording what types of data have been useful to the user in identifying base documents in previous comparison situations and presenting those options as likely predictors of the most suitable base document in the current comparison situation. In some embodiments of the invention, a "relevance factor" for each version or document in the version archive may be determined based on any of the data described herein and/or selected user preferences. Then the base document options may be presented in an order ranked according to these relevance factors.

A particularly beneficial application of this invention is in connection with on-line document collaboration systems in which multiple versions of a document are exchanged among multiple users who store and retrieve documents to and from a database. Versions of different documents may be presented in an organized manner allowing retrieval of both current and prior versions of each of the documents involved. Examples of on-line document collaboration systems are described in U.S. Application Pub. No. 2002/0107768 and U.S. Pub No. 2008/0313186. When used in connection with an on-line document collaboration system, the present invention is particularly helpful in facilitating review of changes made among various drafts posted by the transaction participants.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A physical non-transitory computer-readable medium having a computer program stored thereon for assisting a user in selecting documents for comparison and review, the computer program comprising:
    a code segment for storing a plurality of documents in a database, wherein the plurality of documents includes three or more documents;
    a code segment for selecting one of the plurality of documents to be a current document;
    a code segment for receiving a user-selected portion of the current document;
    a code segment for displaying information to a user for assisting in selecting one of the documents as a base document, wherein the displaying of the information occurs prior to the base document being selected by the user, wherein the information comprises comparison data, wherein the comparison data comprises at least one visual indication regarding which of the plurality of documents contains differences in the user-selected portion of the current document;
    a code segment for receiving a selection from the user of which one of the documents is the base document based on the information displayed to the user; and
    a code segment for creating a comparison document that shows the differences between the current document and the base document.

2. The computer-readable medium of claim 1, wherein the computer program further comprises a code segment for displaying the comparison document on a display or sending the comparison document to a printer to be printed.

3. The computer-readable medium of claim 1, wherein the comparison data comprises information regarding which one or more of the plurality of documents was previously selected by the user as the base document for creating a comparison document.

4. The computer-readable medium of claim 1, further comprising a code segment for receiving relevant text from the user via a user interface, wherein the comparison data comprises information regarding which one or more of the plurality of documents includes the relevant text.

5. The computer-readable medium of claim 1, wherein the comparison document displays text that is the same in both the current and base documents in a first text style, displays text that is only found in the base document and therefore deleted in the current document in a second text style, and displays text that is only found in the current document and therefore newly added in the current document in a third text style.

6. The computer-readable medium of claim 5, wherein the second style is strikethrough, the third style is underline, and the first style is any style absent the strikethrough and the underline.

7. The computer-readable medium of claim 1, wherein the information additionally comprises user activity data, wherein the user activity data includes at least one of the following: which ones of the documents the user has previously opened, a date the user opened the documents, a time the user opened the documents, how long the documents were open for review by the user, which one of the documents was last reviewed by the user, which ones of the documents have not been opened by the user, and which ones of the documents were flagged or otherwise marked as having particular importance or being desired for later comparison by the user.

8. The computer-readable medium of claim 1, wherein the information additionally comprises document data, wherein the document data comprises document file names, document file types, date of posting, and an identity of a poster or author.

9. The computer-readable medium of claim 1, further comprising a code segment for automatically ranking the plurality of documents based at least partially on the comparison data.

10. A physical non-transitory computer-readable medium having a computer program stored thereon for assisting a user in selecting documents for comparison and review, the computer program comprising:
    a code segment for storing a plurality of documents in a database, wherein the plurality of documents includes three or more documents;
    a code segment for creating a plurality of comparison documents, wherein each of the comparison documents depicts differences between two of the plurality of documents;

a code segment for selecting one of the plurality of documents to be a current document;

a code segment for receiving a selection of a relevant portion of the current document from the user;

a code segment for displaying information on a display to a user for assisting in selecting one of the documents as a base document, wherein the displaying of the information occurs prior to the base document being selected by the user, wherein the information comprises comparison data, wherein the comparison data comprises information regarding which one or more of the plurality of documents was previously selected by the user for creating a previous comparison document, wherein the comparison data comprises at least one visual indication regarding which of the plurality of documents contains differences in the user-selected portion of the current document;

a code segment for receiving a selection from the user of which one of the documents is the base document based on the information displayed to the user; and a code segment for opening a specific one of the comparison documents that shows the differences between the current document and the base document.

11. The computer-readable medium of claim 10, wherein the computer program further comprises a code segment for displaying at least a portion of the specific one of the comparison documents on a display or sending at least a portion of the specific one of the comparison documents to a printer to be printed.

12. The computer-readable medium of claim 10, further comprising a code segment for receiving relevant text from the user via a user interface, wherein the comparison data comprises information regarding which one or more of the plurality of documents includes the relevant text.

13. The computer-readable medium of claim 10, wherein the comparison document presents text that is the same in both the current and base documents in a first text style, presents text that is only found in the base document and therefore deleted in the current document in a second text style, and presents text that is only found in the current document and therefore newly added in the current document in a third text style.

14. The computer-readable medium of claim 10, wherein the information additionally comprises user activity data and document data.

15. The computer-readable medium of claim 10, further comprising a code segment for automatically narrowing which ones of the plurality of documents are selectable to be the base document based at least partially on the comparison data.

16. The physical computer-readable media of claim 10, wherein the comparison data comprises keyword search results of text within the documents in the database and differences between user-selected sections of the documents in the database, as extracted by the processor from the comparison documents.

17. A computer-implemented method of assisting a user in selecting and comparing documents for review, the method comprising:

storing, with a processor, a plurality of documents in a computer database, wherein the plurality of documents includes three or more documents;

creating, with the processor, a plurality of comparison documents, wherein each of the comparison documents depicts differences between two of the plurality of documents;

receiving, with the processor, a selection via a user interface of one of the plurality of documents to be a current document;

receiving, with the processor, a selection of a relevant portion of the current document from the user;

displaying, with the processor, information on a display to a user for assisting in selecting one of the documents as a base document, wherein the displaying of the information occurs prior to the base document being selected by the user, wherein the information comprises comparison data, wherein the comparison data comprises at least one visual indication regarding which of the plurality of documents contains differences in the user-selected portion of the current document;

receiving, with the processor, a selection from the user via the user interface regarding which one of the documents is the base document based on the information displayed to the user; and opening, with the processor, and displaying on the display a specific one of the comparison documents that shows the differences between the current document and the base document.

* * * * *